United States Patent

Olerud

[19]

[11] Patent Number: 5,780,005
[45] Date of Patent: Jul. 14, 1998

[54] METHOD FOR MANUFACTURING SPHERICAL SILICA FROM OLIVINE

[76] Inventor: Svein Olerud, Strindveien 75, N-7015 Trondheim, Norway

[21] Appl. No.: 602,772
[22] PCT Filed: Sep. 1, 1994
[86] PCT No.: PCT/NO94/00145
    § 371 Date: Mar. 4, 1996
    § 102(e) Date: Mar. 4, 1996
[87] PCT Pub. No.: WO95/07235
    PCT Pub. Date: Mar. 16, 1995

[30] Foreign Application Priority Data

Sep. 6, 1993 [NO] Norway .................. 933168

[51] Int. Cl.⁶ .................................................. C01B 33/12
[52] U.S. Cl. ........................................ 423/335; 423/340
[58] Field of Search ................................ 423/335, 340

[56] References Cited

U.S. PATENT DOCUMENTS 4,367,215  1/1983  Gjelsvik et al. ........................ 423/335
4,405,588  9/1983  Caballero et al. ...................... 423/340

FOREIGN PATENT DOCUMENTS 356145   9/1931  United Kingdom ................... 423/340
2078703  1/1982  United Kingdom ................... 423/340

*Primary Examiner*—Wayne Langel
*Attorney, Agent, or Firm*—Young & Thompson

[57] ABSTRACT

In a method for manufacturing silica a leaching of natural silicates is performed with hydrochloric acid or other mineral acids, draining, drying and possibly a grinding up of the residue of the product obtained. In order to obtain a spherical silica with a controlled particle size and surface characteristics a mineral olivine with the highest possible degree of purity is employed as the basic material. This raw material is reduced to a grain size between 0.05 and 5 mm. The particles are pretreated and washed for the removal of dust on the grain surfaces and heavy materials such as spinel and at least a part of the foliar and stem-like minerals such as serpentine, talc and pyroxene are removed. The olivine particles are then leached in a controlled leaching process where the acid concentration, leaching temperature and leaching time are controlled in order to achieve the desired primary particle size, specific surface and pore volume measured according to the BET method on the extracted silica. The particle agglomerate of spherical particles thus formed with a grain size between 30 and 70 nanometers are washed and dried in the conventional manner, whereupon the agglomerate is divided into the spherical particles.

7 Claims, 2 Drawing Sheets

METHOD FOR MANUFACTURING SPHERICAL SILICA FROM OLIVINE

FIELD OF THE INVENTION

The invention concerns a method for manufacturing silica in the form of spherical particles with a low content of iron and impurities, by leaching natural silicates with the use of hydrochloric acid or other mineral acids in a reactor, and then separating, washing, drying and possibly grinding up the silica. The raw material used is mineral, preferably monovalent mineral olivine with the highest possible degree of purity, that the raw material is reduced to a particle diameter between 0.05 and 5 mm, preferably 0.1 and 0.5 mm.

BACKGROUND OF THE INVENTION

Silica is generally employed as a filling material over a wide range of products and over an extensive range of applications. In order to achieve the best possible effect as a filling material it is therefore important for it not only to have adequate purity and whiteness, but that it should be possible to surface and pore volume. Substances regarded as impurities in this context are mineralogical particles, ionic deposits and the like. This is of vital importance for the filler's adsorption properties, viscosity-regulating properties, abrasion and refraction properties. It is also important to be able to control the particle size and surface characteristics, thus enabling control to be retained over the introduction of fillers into a product and their effect. In this connection it will be advantageous to be able to manufacture silica in spherical form and with a defined size.

SUMMARY OF THE INVENTION

The object of the invention is to provide a method for the manufacture of the silica with satisfies the above-mentioned requirements, i.e. a spherical silica with a controlled particle size and surface characteristics. This silica has characteristics corresponding to precipitated silica which has a number filler. These products are manufactured from potassium silicate and sulphuric acid. The object of the invention is to develop an alternative process with olivine as a raw material which provides corresponding products.

This object is achieved with a method which is characterized by the features in the patent claims presented.

By means of the invention the surprising discovery has been made that silica prepared from olivine can be formed in the shape of spherical primary particles with a diameter of 30–70 nanometres ($10^{-9}$m). The particles which are extracted by the method according to the invention will be an agglomerate of primary particles which easily disperse in liquids. By means of the invention it has further been discovered that the silica's primary particle size, its specific surface and pore volume, measured according to the BET method, can be adjusted depending on the leaching time, the temperature and acid concentration used in the process. This fact makes it possible by means of the method according to the invention to give the spherical silica particles the desired properties, which are adapted to suit the respective purposes.

For the basic material use is preferably made of crushed olivine, ($Mg_{1.85}$, $Fe_{0.15}$) $SiO_4$ from the most monovalent possible natural mineral deposits. By the admixture of a mineral acid, e.g. HCl, $H_2SO_4$, $HNO_3$, the olivine dissolves and forms a green liquid consisting of the acid's anions and cations which are released from the olivine ($Mg^{2+}$, $Fe^{2+}$, $Ni^{2+}$). In addition a residue of solid material is obtained which is a colloidal amorphous silica ($SiO_2$) in the form of a gel. The silica is separated from the liquid by pressure filters, washed clean of acid remains, dried and ground. A white powder is thus obtained which consists of amorphous silica in the form of primary particles which form larger particle agglomerates. The primary particles will have obtained a spherical shape and a diameter of 30–70 nanometres. The material has a large specific surface (100–450 $m^2$/g), a large pore volume (0.7–1.7 $cm^3$/g) and thus a high degree of porosity. The process can be controlled in such a manner that the desired surface and/or pore volume can be obtained.

After crushing or grinding this product will be able to be employed as a filler, viscosity-regulating medium, as an admixture in concrete, etc.

The leached liquid can be used as a raw material for the manufacture of chemi- cals which contain magnesium, nickel and/or cobalt. The mineral olivine has a content of approximately 30% magnesium and up to 0.3% nickel which dissolves and thus can also be recovered. In the extraction of magnesium metal or magnesium oxide, e.g., the chlorine from the process can be recovered by leaching with hydrochloric acid, converted to hydrochloric acid and recycled.

As already mentioned in the method olivine is used from the most monovalent mineral deposits possible. It is essential to use pure olivine and not olivine which has been converted, e.g., to serpentine, talc and the like.

From Austrian patent no. 352 684 there is previously known a method for extracting silica from serpentine, which also provides silica with large surfaces. This method gives silica particles which have approximately the same shape after the leaching as they had before the leaching. Porous mineral particles are obtained in which the magnesium oxide and iron oxide have been removed from their previous places in the mineral lattice. Thus the material has to be ground down in order to be used and in order to obtain a fine fraction several crushing processes and large amounts of energy have to be employed. Nor is it possible to obtain particles with a grain size as small as 30–70 nanometres by means of ordinary crushing processes. In this process the BET values for the extracted silica are dependent on the grain size of the raw material. The highest BET value is obtained when the raw material which is a serpentine has a grain size between 1 and 3 mm.

Furthermore in Norwegian patent no. 160 200 a method is described for manufacturing active silicon dioxide, derived from natural silicates. The extracted material is subjected to a separation process by means of wet separation methods for separating insoluble parts and heavy soluble parts such as olivine. This shows that for this process other natural silicates than olivine have preferably been employed.

Norwegian patent no. 143 583 describes a method for leaching the metal content in naturally occurring silicates. In order to obtain the greatest possible yield from the leaching of the metal content it has been found that it is advantageous for the grain size of the basic material to be between 0.3 and 5 mm. As a by-product the process provides a residue which mainly consists of silicic acid. Contaminated silicic acid cannot be used for most silica products given present day requirements.

JP-60161320 specifies a method for manufacturing silica gel from particles of a natural silicate mineral such as, e.g., olivine. The particles are treated with acid and washed.

BRIEF DESCRIPTION OF THE DRAWINGS

The invention will now be described in more detail by means of embodiments and figures which illustrate.

DETAILED DESCRIPTION OF THE INVENTION

Figure 1:
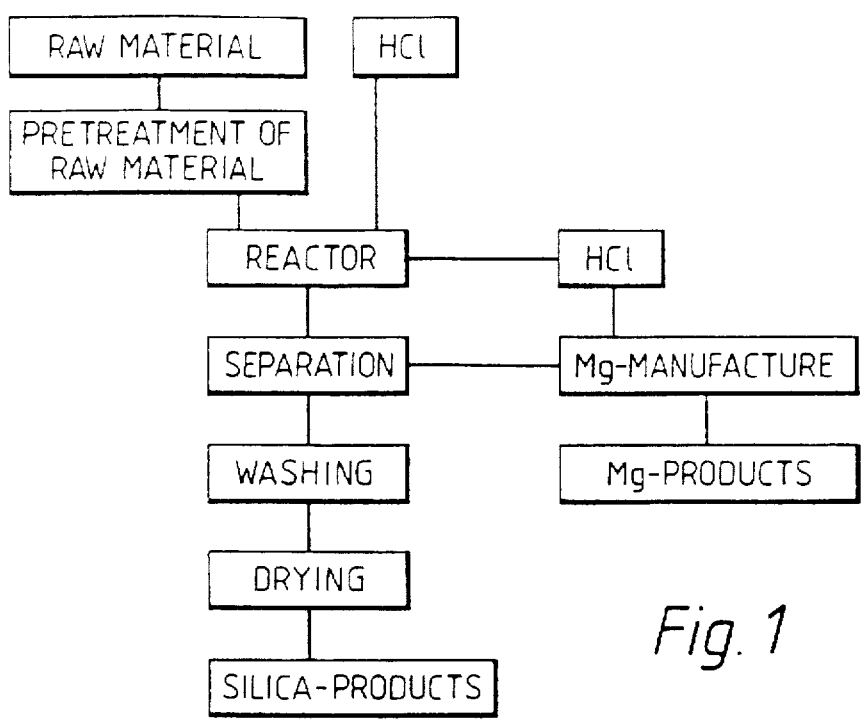
FIG. 1 is a process diagram for the method according to the invention.

FIG. 1 of the drawing is a process diagram illustrating a method for manufacturing chemically precipitated silica by treating olivine with acid. The process is designed in order to give the silica the best possible quality. The diagram illustrates the main principle involved in the manufacture of silica and magnesium products on the basis of olivine and hydrochloric acid, but other mineral acids such as sulphuric acid and nitric acid act in a similar manner.

Olivine of the purest possible quality should be used since most other minerals will not dissolve when treated with acid and will thus represent a possible contamination of the silica product. Most other minerals will end up as solid waste from the process. The olivine which is used is crushed and sifted as a sand fraction. Commercially available Norwegian olivine consists, e.g. of:

| olivine | 90–95 weight percent |
|---|---|
| pyroxene, serpentine | 5 weight percent |
| spinel | 1 weight percent |
| chlorite | 1.5 weight percent |

This olivine has a forsterite content of 92% (92 mol percent forsterite, 8 mol percent fayalite), i.e. approximately 50 weight percent MgO.

Partially serpentinized olivine stone will not provide satisfactory products.

Pretreatment of the olivine sand can be performed by gravitative separation (wash table, spirals or the like) and sifting in order to obtain the desired grain sizes between 0.05–5 mm, preferably 0.1–0.5 mm.

The object is to wash away dust particles on the grain surfaces since the small particles which are not olivine will end up in the silica product as contamination after leaching and separation. In addition heavy minerals such as spinel and some of the foliar and stem-like minerals such as serpentine, talc and pyroxene should be removed before the leaching process in order to reduce the consumption of acid.

Table 1 illustrates an example of the chemical composition of olivine from two different Norwegian deposits before and after treatment with wash table where a heavy mineral fraction and a fine fraction of light, fine-grained and foliar minerals have been separated. Table 1 illustrates that the content of MgO, Ni, and Co increase with this purification process, this being desirable since these elements dissolve during the leaching process and can be extracted from the solution. The $Al_2O_3$ content is substantially reduced, which indicates that most of the pyroxene has been removed, which is clearly desirable. The silica content is somewhat reduced, but this is desirable in this case as this silica is bonded to non-soluble silicates such as pyroxene, serpentine and talc.

TABLE 1

Analyses of olivine sand

| Main elements in % | Sample 1 | | Sample 2 | |
|---|---|---|---|---|
| | Before | After | Before | After |
| $SiO_2$ | 42.29 | 41.33 | 41.86 | 41.82 |
| $Al_2O_3$ | 0.81 | 0.06 | 0.70 | 0.39 |
| $Fe_2O_3$ | 6.1 | 7.36 | 7.71 | 7.92 |
| $TiO_2$ | <0.01 | <0.01 | 0.03 | 0.01 |
| MgO | 47.87 | 49.68 | 48.41 | 49.19 |
| CaO | 0.04 | 0.05 | 0.41 | 0.34 |
| $Na_2O$ | <0.1 | <0.10 | 0.19 | <0.01 |
| $K_2O$ | <0.01 | <0.01 | 0.03 | 0.01 |
| MnO | 0.09 | 0.10 | 0.10 | 0.11 |
| $P_2O_5$ | <0.01 | <0.01 | <0.01 | <0.01 |
| Ignition loss | 1.34 | 0.11 | 0.48 | 0.17 |
| Total | 98.54 | 98.69 | 99.93 | 100.00 |

| Trace elements in ppm: | | |
|---|---|---|
| Zn | 43 | 35 |
| Cu | 7 | 8 |
| Ni | 2700 | 3000 |
| Cr | 3600 | 813 |
| Co | 113 | 135 |

TABLE 2

Analyses of precipitated silica products

| | (pretreated olivine) | (non-pretreated olivine) |
|---|---|---|
| $SiO_2$ | 90.87 | 90.49 |
| $Al_2O_3$ | <0.01 | 0.02 |
| $Fe_2O_3$ | 0.02 | 0.06 |
| $TiO_2$ | <0.01 | <0.01 |
| MgO | 0.16 | 0.32 |
| CaO | 0.01 | 0.03 |
| $Na_2O$ | <0.10 | <0.10 |
| $K_2O$ | <0.01 | <0.01 |
| MnO | <0.01 | <0.01 |
| $P_2O_5$ | <0.01 | <0.01 |
| Ignition loss | 8.20 | 8.11 |
| Total | 99.30 | 99.09 |

Technical data for precipitated olivine.

| Specific surface | 108 $m^2/g$ Measured with the BET method |
|---|---|
| Specific pore volume | 1.55 $c^3/g$ Measured with the BET method |
| Particle density | 0.47 $g/cm^3$ Measured with the BET method |
| Material density | 2.1 $g/cm^3$ Pycnometer measurement |
| Porosity | 73% |
| Primary particle size | 30–70 nm SEM test |
| Bulk density | 0.17 $g/cm^3$ |
| Whiteness | |
| FMX | 94.5% Standard whiteness measurement |
| FMY | 94.4% Standard whiteness measurement |
| FMZ | 94.6% Standard whiteness measurement |
| R457 | 94.6% Standard whiteness measurement |

Table 2 also illustrates the chemical difference between the products in the form of a lower content of Al, Fe, Mg and Ca after treatment. The Fe content in particular is a decisive factor for the whiteness and thereby the quality as a filler.

Technical data also shows that the whiteness from silica which is not pretreated is 4% lower.

Acid is added to the crushed olivine in a reactor with heating and continuous stirring or a reactor of the countercurrent type. The treatment in the acid bath is crucial for determining which silica product is obtained, and the variables here are acid strength, time in the reactor, temperature and grain size of the olivine. Experiment shows that 6N acid of HCl and $H_2SO_4$ give optimum solubility. After several intermediate steps, the main reaction when using hydrochloric acid is:

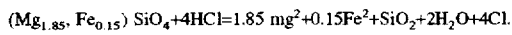
$(Mg_{1.85}, Fe_{0.15}) SiO_4 + 4HCl = 1.85 \text{ mg}^2 + 0.15Fe^2 + SiO_2 + 2H_2O + 4Cl.$ Experiments have been conducted with regard to control of the leaching process. Experiments with 4 different variables in the leaching process give results which correspond to those which were specified in table 1 above. The experiments were performed with varying time, varying temperature, varying acid strength and varying grain size. The experiments were conducted in a laboratory with glass flasks with heating and continuous stirring with a magnetic rotor. The olivine was splashed up in the flask when the acid was boiling. After leaching for a specified time the liquid was poured directly into a centrifugal glass and centrifuged and washed to a pH value of 6. The samples were then dried in a drying cabinet at 110° C. The solubility of olivine varies greatly in the different experiments. The consistency of the silica gel after leaching in the reactor and in the dried product gives a good indication of the specific surface. Gel with high surfaces is transparent, while lower surfaces are white. After drying hard lumps of gel are formed with a specific surface over approximately 300 m²/g, an intermediate group is in the area of 250–300 m²/g, while samples with under approximately 250 m²/g give a loose, airy powder. The specific surface is determined by means of the BET method, see table 3.

Figure 3:
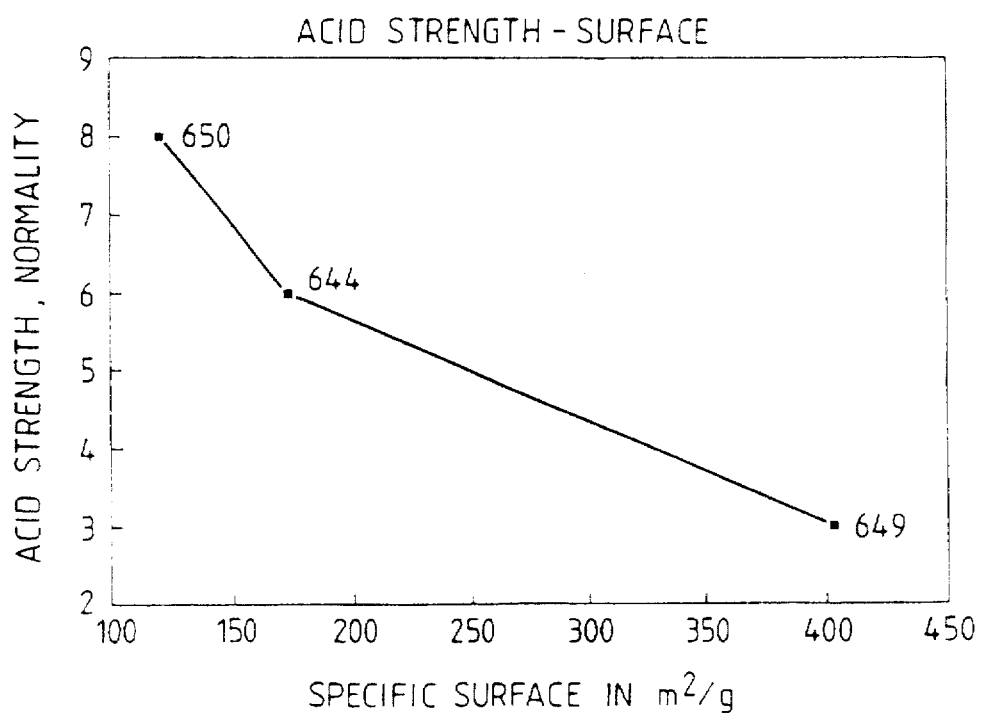
FIGS. 2 and 3 are diagrams illustrating the invention.
Figure 2:
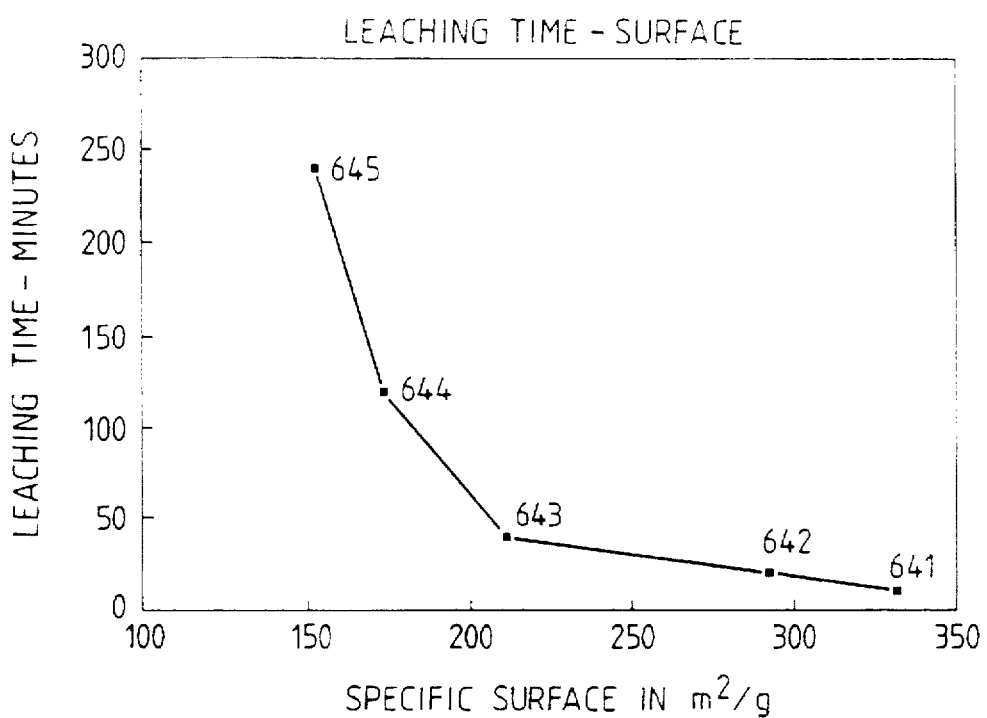
Figure 2:
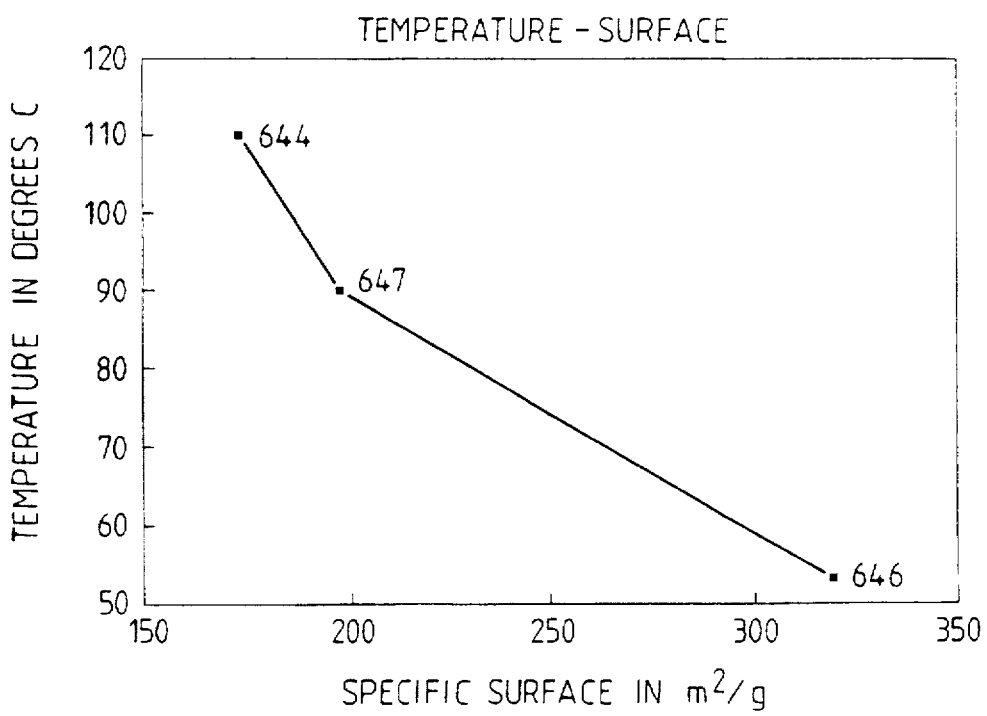

FIGS. 2 and 3 plus Table 3 below illustrate the correlation between the different variables and specific surfaces. The conclusions are:

1. Increasing time in the reactor give a decreasing specific surface and increasing pore volume.
2. Stronger acid gives decreasing specific surface and increasing pore volume.
3. Increasing temperature gives decreasing surface and increasing pore volume.
4. The correlation between grain size and specific surface is not unambiguous.

On the basis of these findings it has been possible to establish that the control of the leaching process based on the above criteria can predict specific surface and pore volume for the product.

Precipitated silica can be industrially separated from the acid bath with pressure filters. Several qualities can be industrially separated from one another with cyclones. The separation is relatively simple since most of the "contaminated" particles of other mineral grains, which are unaffected or only partially affected by the acid treatment are heavier or larger than the primary silica particles and it will therefore be possible to separate them by means of gravitative separation.

TABLE 3

| No. | time | temp. °C. | grain size | acid strength | Spec. surface m²/g | Pore volume ml/g | Pore diameter A | consistency |
|---|---|---|---|---|---|---|---|---|
| 641 | 10 min | 110 | 0.5 mm | 6 N | 331 | 1.14 | 230 | hard lumps |
| 642 | 20 min | 110 | 0.5 mm | 6 N | 292 | 1.29 | | hard lumps |
| 643 | 40 min | 110 | 0.5 mm | 6 N | 211 | 1.34 | | loose powder |
| 644 | 2 h | 110 | 0.5 mm | 6 N | 173 | 1.35 | | loose powder |
| 645 | 4 h | 110 | 0.5 mm | 6 N | 152 | 1.39 | | loose powder |
| 646 | 2 h | 53 | 0.5 mm | 6 N | 319 | 1.10 | | hard lumps |
| 647 | 2 h | 90 | 0.5 mm | 6 N | 197 | 1.35 | | loose powder |
| 648 | 20 min | 110 | 0.18 mm | 3 N | 450 | 0.95 | 100 | hard lumps |
| 649 | 2 h | 110 | 0.5 mm | 3 N | 403 | 1.19 | 150 | hard lumps |
| 650 | 2 h | 110 | 0.5 mm | 8 N | 120 | 0.74 | | loose powder |
| 651 | 3 min | 110 | 0.18 mm | 6 N | 269 | 1.31 | 300 | hard lumps |
| 652 | 20 min | 110 | 0.18 mm | 6 N | 267 | 1.66 | | medium hard |
| 653 | 40 min | 110 | 0.18 mm | 6 N | 235 | 1.50 | | medium hard |
| 654 | 2 h | 110 | 0.5 mm | 3 N* | 427 | 1.00 | 110 | hard lumps |
| | 20 min | 110 | 0.5 mm | 3 N | | | | too low solubility |
| | 2 h | 110 | 0.5 mm | 1.5 N | | | | too low solubility |
| | 2 h | 26 | 0.5 mm | 6 N | | | | too low solubility |

*Half quantity of acid.

Washing of silica in order to remove acid remains is repeated until the salts have been removed and the desired pH has been achieved for the product. This can be done industrially with pressure filters, where water is added to the filter cake between each filtration.

Drying produces a white, light crust whose consistency will vary with the specific surface. High specific surfaces produce hard lumps which have to be ground down, low specific surfaces produce a loose powder which does not require grinding.

Grinding to the desired particle size can be performed according to requirements.

The chemical and physical data (table 2) for precipitated silica produced by acid treatment of olivine corresponds to what is normally described internationally as precipitated silica. These products are made of potassium silicate ($Na_2SiO_3$) to which is added an acid (usually sulphuric acid) and reacts to colloidal silica which is then washed, dried and ground down to the desired aggregate size. By preparing precipitated silica directly from olivine it is not necessary to use potassium silicate which is normally made from quartz ($SiO_2$) and $Na_2CO_3$, at approximately 1400° C. or from quartz and Na(OH) at 150°–200° C. and high pressure Production costs will be lower in the olivine-based process than in the traditional one since:

The energy consumption is lower for manufacturing the product. Olivine is considerably cheaper as a raw material than potassium silicate which is made from quartz, bicarbonate of soda and/or sodium hydroxide. A combination of a process which chemically utilizes the leached Mg, and possibly Ni in the olivine, and which can recycle the mineral acids used will be financially and environmentally favourable.

Spherical silica obtained by the method according to the invention can be used in many different ways. The most advantageous areas of application are listed below:

Filler in rubber and plastic.
Filler, thickener in paint.
Filler, thickener in glue and putty.
Carrier for sprays.
Admixture for paper pulp.
Anticaking and free-flow agents.
Antiblocking agents.
Admixture for toothpaste, thickening and polishing agents.
Admixture in concrete (pozzolan).
Fireproof materials.
Raw materials for silicones, silanes, etc.

Silica manufactured according to the invention will naturally also be able to be used for other purposes than that described above if this is advantageous.

I claim:

1. A method of manufacturing silica in the form of spherical particles having a reduced content of iron and impurities, the method comprising:

a) pretreating substantially pure mineral olivine to obtain olivine particles having a particle diameter ranging between 0.05 and 5 mm;

b) washing the particles to remove dust from the surfaces of the particles;

c) removing from the washed particles heavy minerals, and at least a portion of the foliar and stem-like minerals;

d) leaching the particles with a mineral acid in a reactor under controlled temperature for a period of time to obtain extracted silica having a desired specific surface and pore volume, said mineral acid being selected from the group consisting of hydrochloric acid, sulfuric acid, and nitric acid;

e) separating extracted silica from the mineral acid;

f) washing the silica to remove residual acid therefrom;

g) drying the washed silica and optionally grinding;

h) the dried silica particles to form spherical particles of silica having a diameter ranging between 30–70 nanometers.

2. The method according to claim 1, wherein the mineral olivine has the following composition:

| | |
|---|---|
| SiO | 30–43 weight percent |
| FeO | 0–70 weight percent |
| MgO | 0–57 weight percent |
| Ni | 0–0.5 weight percent |
| Ignition loss | 0–5 weight percent. |

3. The method according to claim 1, wherein the mineral olivine has a fosterite content of about 92%.

4. The method according to claim 1, wherein the heavy minerals include spinel, and the foliar and stem-like minerals include serpentine, talc and pyroxene.

5. The method according to claim 1, wherein pretreating the mineral olivine comprises crushing the mineral olivine, and sifting the crushed olivine.

6. The method according to claim 1, wherein the step of leaching is carried out under continuous stirring.

7. The method according to claim 1, wherein the specific surface ranges from 100–450 $m^2/g$, and the pore volume ranges from 0.7–1.7 $cm^3/g$.

* * * * *